(12) United States Patent
Wang

(10) Patent No.: US 12,726,725 B2
(45) Date of Patent: Sep. 1, 2026

(54) CAMERAS FOR MULTIPLE VIEWS

(71) Applicant: Apple Inc., Cupertino, CA (US)

(72) Inventor: Paul X. Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 293 days.

(21) Appl. No.: 18/219,038

(22) Filed: Jul. 6, 2023

(65) Prior Publication Data

US 2024/0064420 A1 Feb. 22, 2024

Related U.S. Application Data

(60) Provisional application No. 63/399,174, filed on Aug. 18, 2022.

(51) Int. Cl.
*H04N 23/90* (2023.01)
*G06F 1/16* (2006.01)
*H04N 5/268* (2006.01)
*H04N 23/57* (2023.01)

(52) U.S. Cl.
CPC ............. *H04N 23/90* (2023.01); *G06F 1/163* (2013.01); *H04N 5/268* (2013.01); *H04N 23/57* (2023.01)

(58) Field of Classification Search
CPC ........................................................ G09G 5/37
See application file for complete search history.

(56) References Cited

U.S. PATENT DOCUMENTS 11,563,700 B2 * 1/2023 Mullins ................ H04N 13/332
11,688,905 B1 * 6/2023 Howard ............. H01M 50/121 429/176
11,750,009 B2 * 9/2023 Obie .................. G02B 27/0176 307/20
2018/0154851 A1 6/2018 Thieberger et al.
2021/0134156 A1 5/2021 Lee
2021/0173480 A1 * 6/2021 Osterhout ........... G06F 3/04815

FOREIGN PATENT DOCUMENTS

GB 2619367 A * 12/2023 ......... G02B 27/0176
JP 2021527998 A * 10/2021 ........... H04N 23/667
WO WO-2013049248 A2 * 4/2013 ............. G06F 3/167

OTHER PUBLICATIONS

English translation of JP-2021527998-A, 2021 (Year: 2021).*
Schoop, et al., "HindSight: Enhancing Spatial Awareness by Sonifying Detected Objects in Real-Time 360-Degree Video," CHI 2018 Paper, Apr. 2018, 12 pages.

* cited by examiner

*Primary Examiner* — James M Hannett
(74) *Attorney, Agent, or Firm* — BAKERHOSTETLER

(57) ABSTRACT

A head-mountable device can have multiple cameras, which may be used to generate graphical content, provide a video passthrough of the environment, and/or sense objects, people, or events in the environment. The cameras of the head-mountable device can capture views that are output to a display. Other sensors and/or detectors can detect the presence or motion of objects and/or events in an environment of the user and provide outputs that call the user's attention to such objects and/or events. The outputs can include notifications, selectable features of a visual display output, and/or a view that includes the objects and/or events. The cameras can be integrated in a way that provides a low profile, such as by incorporation with other features of the head-mountable device.

13 Claims, 7 Drawing Sheets

CAMERAS FOR MULTIPLE VIEWS

CROSS-REFERENCE TO RELATED APPLICATION

This application claims the benefit of U.S. Provisional Application No. 63/399,174, entitled "CAMERAS FOR MULTIPLE VIEWS," filed Aug. 18, 2022, the entirety of which is incorporated herein by reference.

TECHNICAL FIELD

The present description relates generally to head-mountable devices, and, more particularly, to head-mountable devices with camera that provide multiple views.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Disclosed herein are embodiments of head-mountable devices having several cameras, which may be used to generate graphical content, provide a video passthrough of the environment, and/or sense objects, people, or events in the environment. The cameras of the head-mountable device can capture views that are output to a display. Other sensors and/or detectors can detect the presence or motion of objects and/or events in an environment of the user and provide outputs that call the user's attention to such objects and/or events. The outputs can include notifications, selectable features of a visual display output, and/or a view that includes the objects and/or events. The cameras can be integrated in a way that provides a low profile, such as by incorporation with other features of the head-mountable device.

These and other embodiments are discussed below with reference to FIGS. 1-13. However, those skilled in the art will readily appreciate that the detailed description given herein with respect to these Figures is for explanatory purposes only and should not be construed as limiting.

Figure 1:
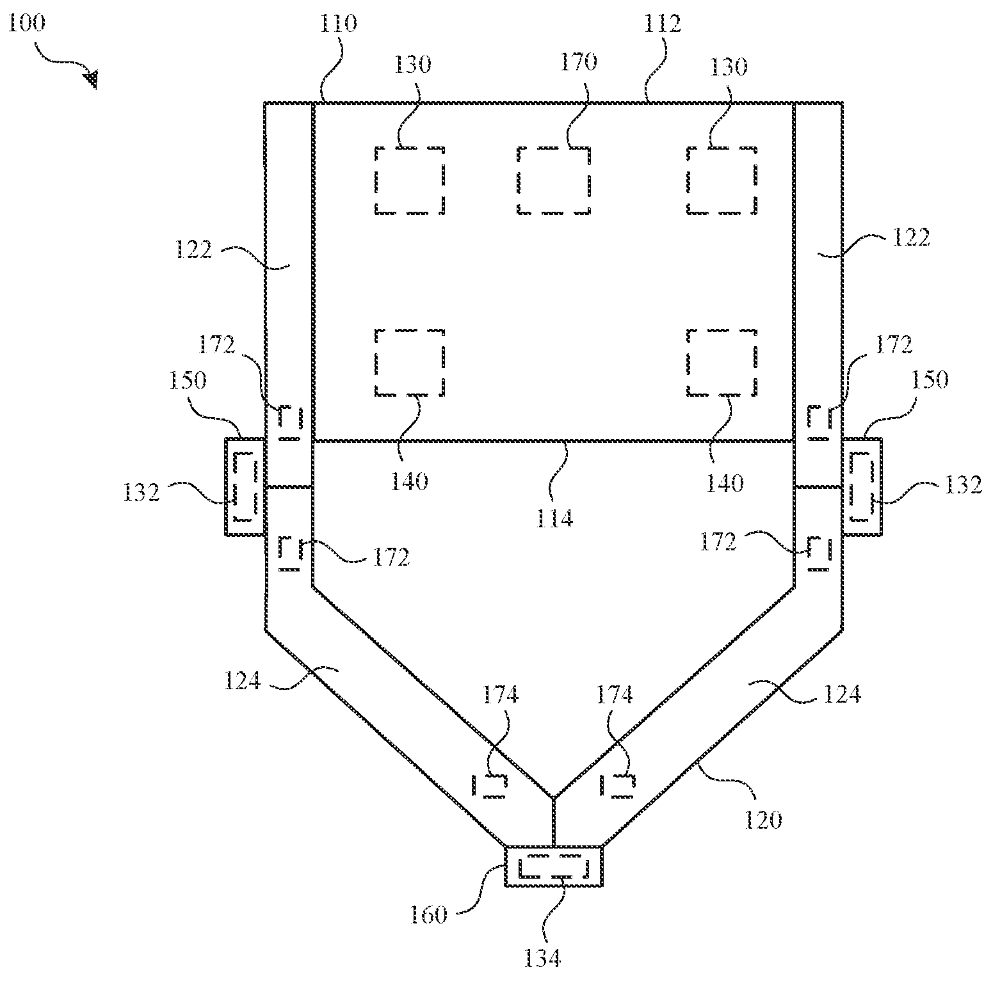
FIG. 1 illustrates a top view of a head-mountable device, according to some embodiments of the present disclosure.
Figure 2:
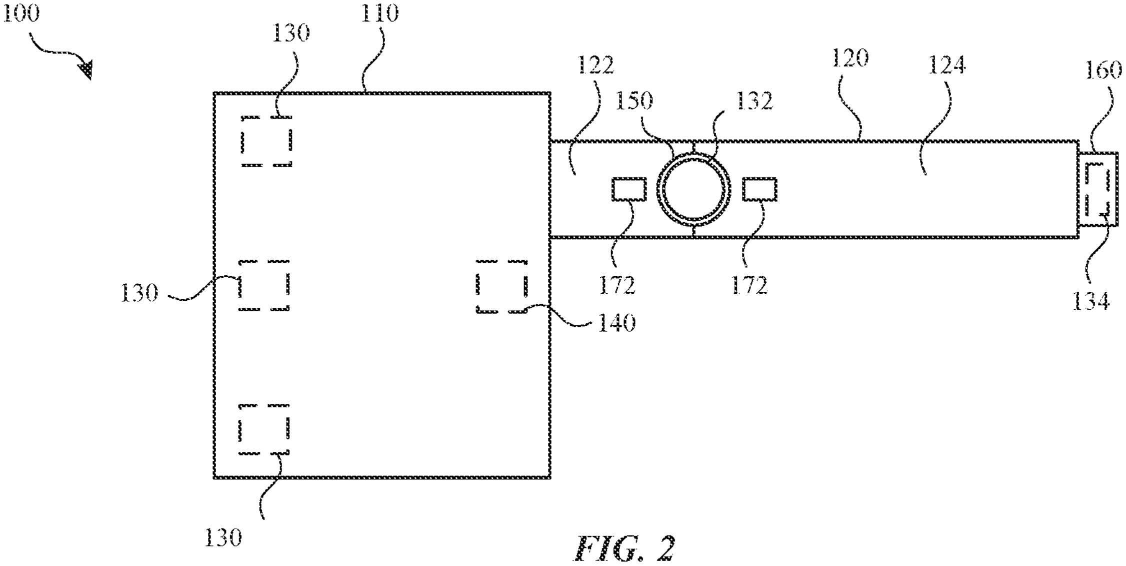
FIG. 2 illustrates a side view of the head-mountable device of FIG. 1, according to some embodiments of the present disclosure.
Figure 3:
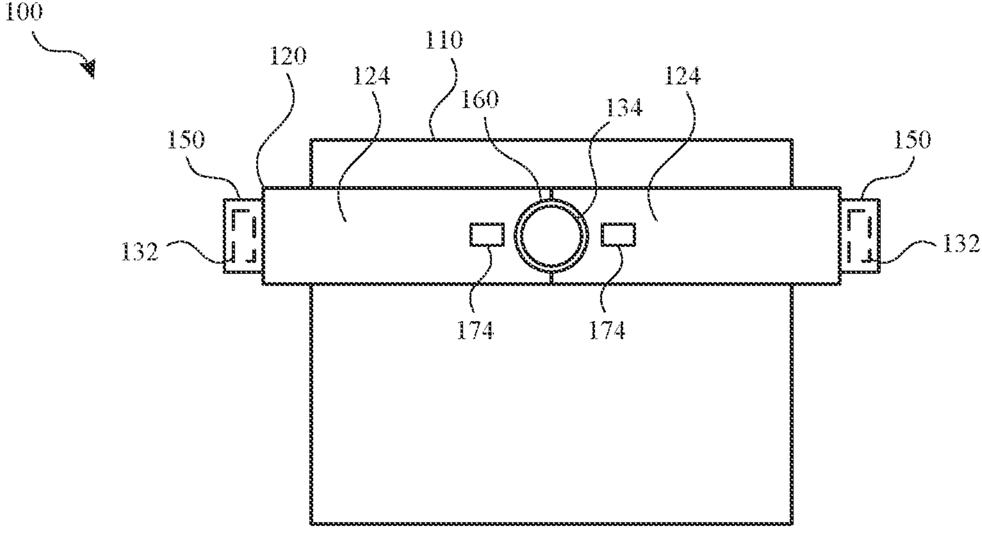
FIG. 3 illustrates a rear view of the head-mountable device of FIGS. 1 and 2, according to some embodiments of the present disclosure.

Referring now to FIGS. 1-3, a head-mountable device can include cameras and other features that provide a user with an awareness of the environment of the user.

As shown in FIG. 1, a head-mountable device 100 can include a frame 110 that is worn on a head with a head engager 120. The frame 110 can be positioned in front of the eyes of a user to provide information within a field of view of the user. The frame 110 can provide nose pads or another feature to rest on a user's nose. The frame 110 further includes one or more displays 140 (e.g., one for each eye) and a bridge above the nose pads and connecting multiple displays 140.

The head-mountable device 100 can include one or more cameras 130 for capturing a view of an environment external to the head-mountable device 100. The cameras 130 can be positioned on or near an outer side of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the frame 110.

One or more displays 140 can be positioned on or near an inner side of the frame 110. As used herein, an inner side of a portion of a head-mountable device 100 is a side that faces toward the user and/or away from the external environment. The display 140 can provide visual (e.g., image or video) output based on the view captured by the camera 130. For example, a display 140 can transmit light from or based on a physical environment for viewing by the user. The display 140 can include components with optical properties, such lenses for vision correction based on incoming light from the physical environment. Additionally or alternatively, a display 140 can provide information as a display within a field of view of the user. Displayed information can be provided to the exclusion of a view of a physical environment or in addition to (e.g., overlaid with) a physical environment.

A physical environment relates to a physical world that people can sense and/or interact with without necessarily requiring the aid of an electronic device. A computer-generated reality environment relates to a wholly or partially simulated environment that people sense and/or interact with the assistance of an electronic device. Examples of computer-generated reality include mixed reality and virtual reality. Examples of mixed realities can include augmented reality and augmented virtuality. Some examples of electronic devices that enable a person to sense and/or interact with various computer-generated reality environments include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable device can have an integrated opaque display, have a transparent or translucent display, or be configured to accept an external opaque display (e.g., smartphone).

While coupled to the frame 110, each display 140 can be adjusted to align with a corresponding eye of the user. For example, each optical assembly 200 can be moved along one or more axes until a center of each display 140 is aligned with a center of the corresponding eye. Accordingly, the distance between the displays 140 can be set and/or changed based on an interpupillary distance ("IPD") of the user. IPD is defined as the distance between the centers of the pupils of a user's eyes. The cameras 130 can optionally move with the displays 140.

Multiple cameras 130 can be provided on a front side of the head-mountable device 100. For example, one camera 130 can be provided for each of the displays 140. Each camera can capture a field of view that is displayed on the corresponding display 140, which can in turn be aligned with a corresponding one of the user's eyes. In some embodiments, additional cameras 130 can be supported by the frame 110 to capture views on a front region of the head-mountable device 100. For example, additional cameras 130 can capture views that are not output on the displays 140. By further example, additional cameras can capture portions of the user's body. Such portions can include the face, torso, hands, arms, and other portions of the user. By capturing such views of the user, gestures and other motions by the user can be interpreted as user inputs.

The frame 110 and/or the head engager 120 can serve to surround a peripheral region of the head-mountable device 100 as well as support any internal components in their assembled position. For example, the frame 110 and/or the head engager 120 can enclose and support various internal components (including for example integrated circuit chips, processors, sensors, input/output devices, memory devices, and other circuitry) to provide computing and functional operations for the head-mountable device 100, as discussed further herein.

The frame 110 can be supported on a user's head with the head engager 120. The head engager 120 can wrap or extend along opposing sides of a user's head. It will be appreciated that a variety of configurations can be applied for securing the head-mountable device 100 to a user's head. For example, one or more bands, straps, belts, caps, hats, or other components can be used in addition to or in place of the illustrated components of the head-mountable device 100.

As further shown in FIG. 1, the head engager 120 can include arms 122 extending from opposing sides of the frame 110. Each of the arms 122 can be removably coupled to the Frame 110 of the head-mountable device 100. The arms 122 can provide a flexible or rigid structure for support. The head engager 120 can further include a band with band portions 124 for extending to and/or about a rear side of the head of the user. Each of the band portions 124 can optionally extend from ends of the arms 122, for example, the ends that are opposite the frame 110. The band portions 124 can be stretchable to comfortably provide tension about the head of the user. The head engager 120 can further include an adjuster 160 for adjusting a tightness and/or fit of the head engager 120, as described further herein.

The frame 110, the arms 122, and the band portions 124 can together form a continuous loop for encircling a head of the user. The arms 122 and the band portions 124 can be securely but releasably connected to each other, for example by connectors 150. The connectors 150 can release the arms 122 and the band portions 124 from each other as desired. One or more of various mechanisms can be provided to secure the segments to each other. For example, the connectors 150 can include locks, latches, snaps, buttons, slides, channels, screws, clasps, threads, magnets, pins, an interference (e.g., friction) fit, knurl presses, bayoneting, fused materials, weaves, knits, braids, and/or combinations thereof to couple and/or secure the arms 122 and the band portions 124 together. For example, the connector 150 can be coupled to each of a corresponding arm 122 and a corresponding band portion 124. By further example, the connector 150 can extend from one of an arm 122 and a band portion 124 and through the other of the arm 122 and the band portion 124. It will be understood that the connectors 150 can include and/or interact with components on either or both of the arms 122 and the band portions 124 to be connected thereby.

As further shown in FIG. 1, on a front side of the head-mountable device 100 and/or near the cameras 130 (e.g., at the frame 110), one or more front sensors 170 can be provided to detect objects and/or event on the front side of the head-mountable device 100. For example, a front sensor 170 can be supported by the frame 110. The front sensors 170 can be operated to detect objects and/or events, and the camera 130 can be operated in response to such detections and/or other inputs, as described further herein.

As shown in FIG. 2, each of the connectors 150 can support a camera 132. The cameras 132 positioned at the connectors 150 can thereby be positioned on the corresponding sides of the head-mountable device 100. For example, the sides at which the cameras 132 can be positioned can be on the lateral sides that connects the front and rear sides of the head-mountable device 100. By positioning the cameras 132 on the connectors 150, the cameras 132 can be oriented in a direction that captures the desired field of view on sides of the head-mountable device 100. Such a position can also allow the cameras 132 to be provided within an existing structure that serves multiple purposes, such as coupling the corresponding arm 122 to the corresponding band portion 124. Additionally, where the connectors 150 protrude from either of the arm 122 and/or the band portion 124, the arrangement of the camera 132 on the connector 150 can provide a position that is away from the other portions of the head-mountable device 100, thereby providing a wider field of view that would otherwise be partially occluded by the other components of the head-mountable device 100.

On a lateral side of the head-mountable device 100 and/or near the camera 132, one or more lateral sensors 172 can be provided to detect objects and/or event on the corresponding side of the head-mountable device 100. For example, a lateral sensor 172 can be provided on an arm 122 and/or a band portion 124. The lateral sensors 172 can be operated to detect objects and/or events, and the camera 132 can be operated in response to such detections and/or other inputs, as described further herein.

As shown in FIG. 3, the adjuster 160 can support a camera 134. The camera 134 positioned at the adjuster 160 can thereby be positioned on the rear side of the head-mountable device 100. For example, the sides at which the camera 134 can be positioned can be on the side that is opposite the frame 110 of the head-mountable device 100. By positioning the camera 134 on the adjuster 160, the camera 134 can be oriented in a direction that captures the desired field of view behind the user of the head-mountable device 100. Such a position can also allow the camera 134 to be provided within an existing structure that serves multiple purposes, such as adjusting the head engager 120. Additionally, where the adjuster 160 protrudes from the band portions 124, the arrangement of the camera 134 on the adjuster 160 can provide a position that is away from the other portions of the head-mountable device 100, thereby providing a wider field of view that would otherwise be partially occluded by the other components of the head-mountable device 100.

On a rear side of the head-mountable device 100 and/or near the camera 134, one or more rear sensors 174 can be provided to detect objects and/or event on the rear side of the head-mountable device 100. For example, a rear sensor 174 can be provided one or both band portions 124. The rear sensors 174 can be operated to detect objects and/or events, and the camera 134 can be operated in response to such detections and/or other inputs, as described further herein.

In some embodiments, the sensors 170, 172, and/or 174 can include one or more of a variety of sensors. In some embodiments, such mechanisms can be provided for detecting objects and/or events in the environment. Such sensors can have detection capabilities for each of the cameras and their corresponding fields of view.

In some embodiments, the head-mountable device 100 can include multiple microphones as the sensors 170, 172, and/or 174, which can be distributed on the frame 110 and/or the head engager 120. The microphones can be spatially distributed evenly or unevenly. The microphones can be omnidirectional or directional. One or more of the microphones can be or include a directional microphone that is configured to be most sensitive to sound in a particular direction. Such directionality can be provided based on structural features of the microphone and/or surrounding structures. For example, one or more of the microphones can include or be adjacent to a parabolic reflector that collects and focuses sound waves from a particular direction onto a transducer. Based on the known directionality relative to other portions of the head-mountable device 100, sound received by such a microphone can be attributed to a source in a particular direction with respect to the head-mountable device 100. Different microphones can be oriented with different directionalities to provide an array of coverage that captures sounds from a variety of (e.g., all) directions.

An array of multiple microphones as sensors 170, 172, and/or 174 can be operated to isolate a sound source and reject ambient noise and reverberation. For example, multiple microphones can be operated to perform beamforming by combining sounds from two or more microphones to allow preferential capture of sounds coming from certain directions. In a delay-and-sum beamformer, sounds from each microphone are delayed relative to sounds from the other microphones, and the delayed signals are added. The amount of delay determines the beam angle (e.g., the angle in which the array preferentially "listens"). When a sound arrives from this angle, the sound signals from the multiple phones are added constructively. The resulting sum is stronger, and the sound is received relatively well. When a sound arrives from another angle, the delayed signals from the various microphones add destructively (e.g., with positive and negative parts of the sound waves canceling out to some degree) and the sum is not as loud as an equivalent sound arriving from the beam angle. For example, if a sound arrives at a microphone on the right before it enters a microphone on the left, then it can be determined that the sound source is to the right of the microphone array. During sound capturing, a controller (e.g., processor) can "aim" a capturing beam in a direction of the sound source. Beamforming allows a microphone array to simulate a directional microphone pointing toward the sound source. The directivity of the microphone array reduces the amount of captured ambient noises and reverberated sound as compared to a single microphone. This may provide a clearer representation of a sound source. A beamforming microphone array may made up of distributed omnidirectional microphones linked to a processor that combines the several inputs into an output with a coherent form. Arrays may be formed using numbers of closely spaced microphones. Given a fixed physical relationship in space between the different individual microphone transducer array elements, simultaneous digital signal processor (DSP) processing of the signals from each of the individual microphones in the array can create one or more "virtual" microphones.

In some embodiments, the sensors 170, 172, and/or 174 can include, for example, one or more image sensors, one or more depth sensors, one or more infrared sensors, one or more thermal (e.g., infrared) sensors, and/or generally any sensors that may be used to detect physical objects and/or events.

Figure 4:
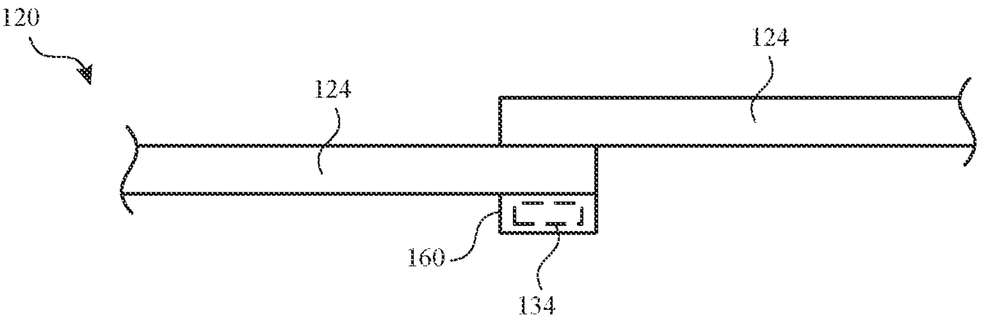
FIG. 4 illustrates a top view of an adjustable head engager, according to some embodiments of the present disclosure.
Figure 5:
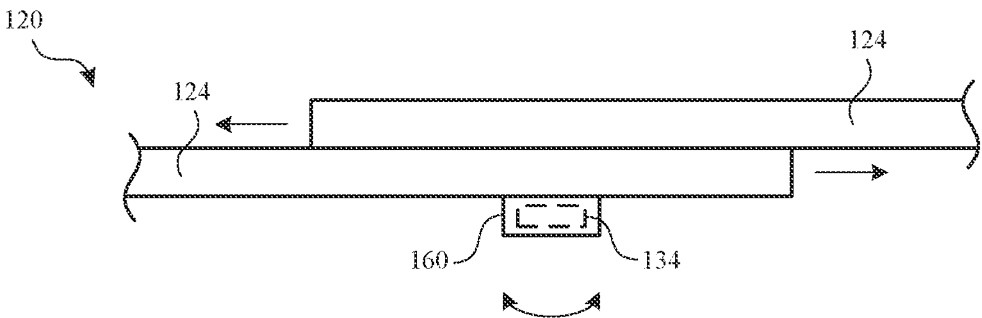
FIG. 5 illustrates another top view of the adjustable head engager of FIG. 4, according to some embodiments of the present disclosure.

Referring now to FIGS. 4 and 5, the tightness of the head engager can be adjusted as desired by the user and/or the system. In some embodiments, the head engager 120 can further include an adjuster 160 for adjusting a tightness and/or fit of the head engager 120. The adjuster 160 can, for example, be operated to alter a total length of the head engager 120 and/or a distance between the arms 122 (i.e., along the band portions 124). By further example, the adjuster can alter an amount of overlap between two separate band portions 124, thereby changing the combined length across the combined structure defined by the band portions 124. The adjuster 160 can be operated manually by a user and/or by a controller of the head-mountable device 100 (e.g., in the frame 110). Operation of the adjuster 160 can alter the fit of the tension in the head engager 120 as well as the clamping force of the arms 122 on sides of the user's head.

In some embodiments, the adjuster 160 can be rotated to alter the tightness of the head engager 120. For example, as the adjuster 160 is rotated in one direction, the band portions 124 can be moved apart, and as the adjuster 160 is rotated in a different direction, the band portions 124 are moved together. It will be understood that operation of the adjuster 160 can change a position and/or orientation of the camera 134 mounted thereon. The camera 134 can be provided with one or more sensors to track movement of the adjuster 160 and/or detected position and/or orientation, for example in a gravitational frame of reference. Detected conditions (e.g., position and/or orientation) of the camera 134 can be applied to correct or otherwise modify any images captured by the camera 134.

Figure 6:
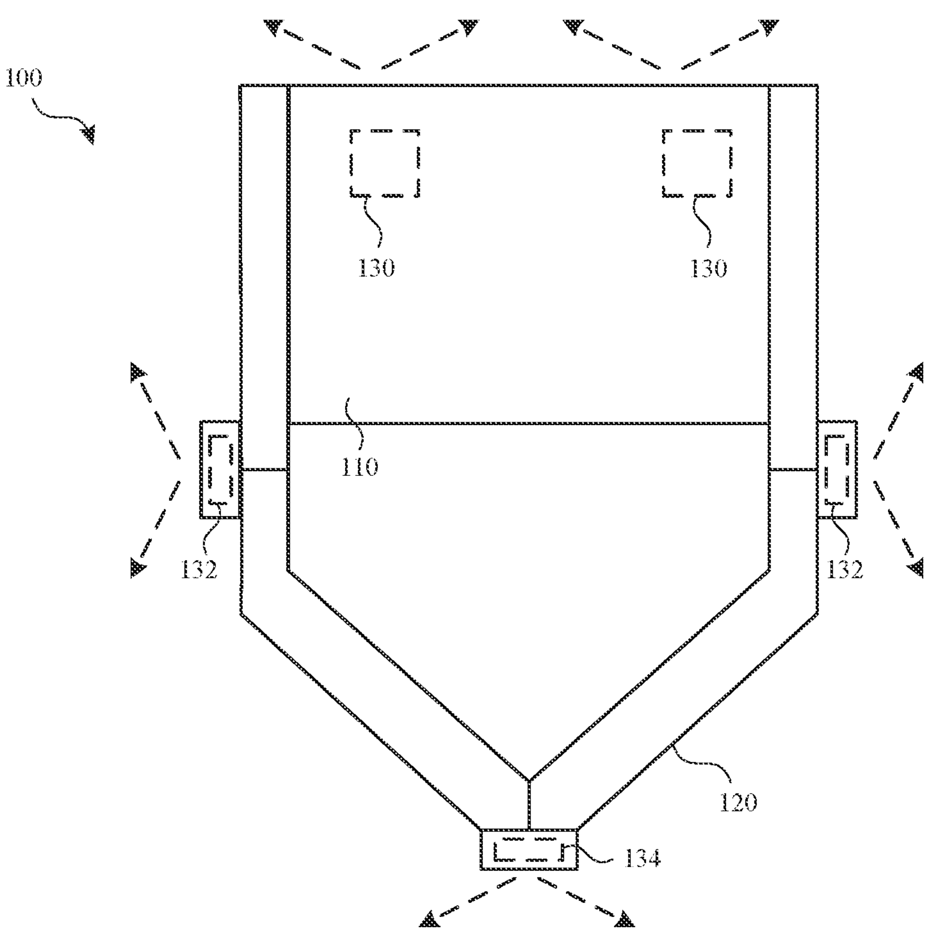
FIG. 6 illustrates a top view of a head-mountable device, according to some embodiments of the present disclosure.
Figure 7:
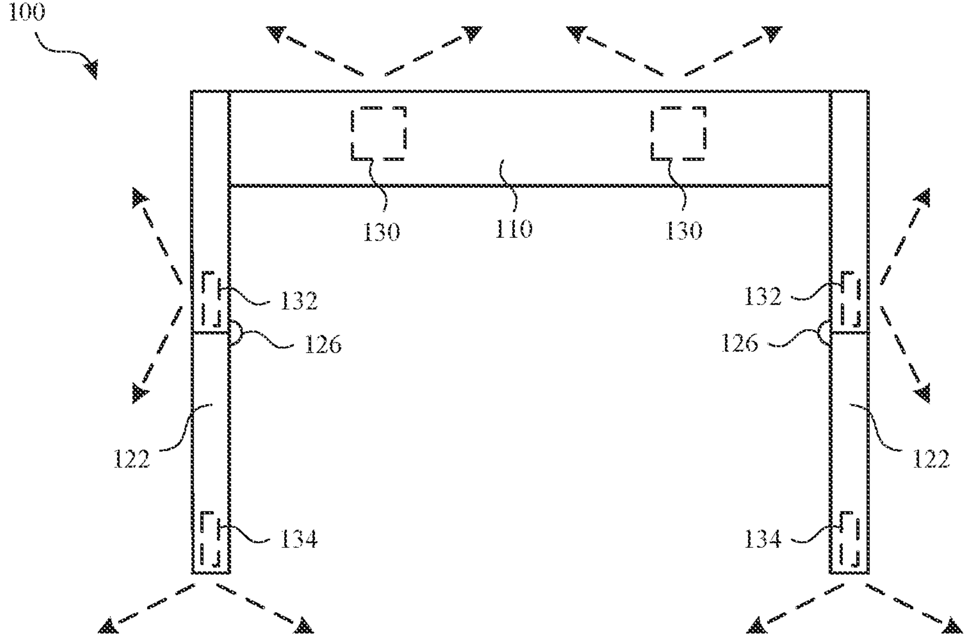
FIG. 7 illustrates a top view of a head-mountable device, according to some embodiments of the present disclosure.

Referring now to FIGS. 6 and 7, cameras of a head-mountable device can provide a variety of views. The various views can be used for detection, recording, transmission, and/or output to a user.

As illustrated in FIGS. 6 and 7, the fields of view of the cameras 130, 132, and 134 at least partially overlap each other to cooperatively provide the head-mountable device 100 with a continuous, combined field of view. In some embodiments, the combined field of view can be fully continuous about the head-mountable device 100. The fields of view of the individual cameras 130, 132, and 134 overlap each other horizontally entirely around the head-mountable device 100 and, thereby, around the head of the user, such that the combined field of view is 360 degrees horizontal. The field of view of each one of the cameras 130, 132, and 134 can be greater than 90 degrees, 120 degrees, 150 degrees, or 180 degrees.

The cameras 130, 132, and 134 can be configured according to position, orientation, and camera field of view. The position of each of the cameras 130, 132, and 134 refers to the position thereof relative to the head of the user and/or each other. The orientation of each of the cameras 130, 132, and 134 refers to the direction in which the corresponding camera faces (e.g., of an optical axis thereof), which may be measured relative to the head of the user and/or each other. The camera field of view of each of the cameras 130, 132, and 134 may be characterized by horizontal and vertical angular ranges (e.g., a horizontal camera field of view).

The cameras 130, 132, and 134 can be of any suitable type for the applications and methods described herein. For example, each of the cameras 130, 132, and 134 may include an image sensor and an optical element (e.g., a lens) that refracts and/or reflects light to the image sensor. The image sensor interprets light into image sensor signals and may, for example, be a complementary metal oxide semiconductor (CMOS) or charge-coupled device (CCD) sensor. The image sensor may detect light in a suitable spectrum (e.g., the visible light spectrum) and have a suitable resolution for the applications and uses described herein. In some embodiments, the cameras 130, 132, and 134 may have different characteristics from each other. For example, cameras that provide video passthrough may be color-detecting cameras, while cameras used only for sensing the environment may be black-and-white cameras.

As shown in FIG. 6, the cameras 130 can each capture a view on a front side of the head-mountable device 100, the cameras 132 can each capture a view on a corresponding lateral side of the head-mountable device 100, and the camera 134 can capture a view on a rear side of the head-mountable device 100. While only five cameras are illustrated, it will be understood that any number of cameras can be included, where each camera can have a different position and/or orientation along the frame 110, the arms 122, and/or the band portions 124.

As shown in FIG. 7, a head-mountable device 100 can include arms 122 collectively forming the head engager. The arms 122 can be connected to only the frame 110, rather than directly to each other, such as with band portions on a rear side of the head-mountable device 100. By further, example, the arms 122 can form free ends that engage a head of the user, such as near, over, or around the ears.

As further shown in FIG. 7, the cameras 130 can each capture a view on a front side of the head-mountable device 100, the cameras 132 can each capture a view on a corresponding lateral side of the head-mountable device 100, and the cameras 134 can each capture a view on a rear side of the head-mountable device 100. As the arms 122 form free terminal ends, the cameras 134 can be oriented in a rearward direction to capture views behind the user. The arms 122 can optionally include a hinge 126 that facilitates collapse of the arms 122 against or towards the frame 110. The hinge 126 can optionally separate the camera 132 from the camera 134. While only six cameras are illustrated, it will be understood that any number of cameras can be included, where each camera can have a different position and/or orientation along the frame 110 and/or the arms 122.

Referring now to FIGS. 8-11, a head-mountable device can be operated to provide one or more of a variety of outputs to the user based on and/or in response to captured views and/or detected conditions in the environment. It will be understood that, while a particular head-mountable device is depicted, any one or more of the head-mountable devices described herein can be operated to provide the outputs and/or user interfaces described herein.

Figure 8:
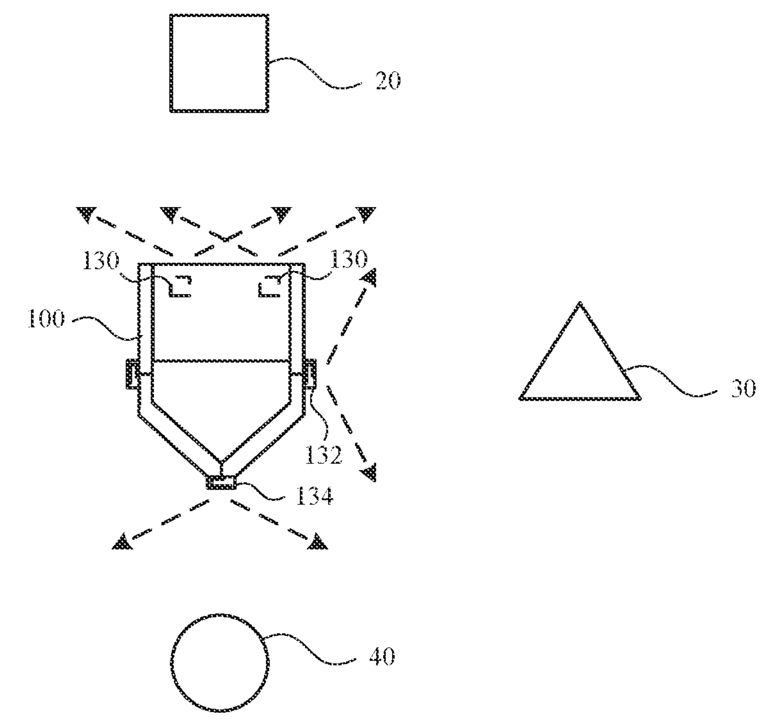
FIG. 8 illustrates a top view of a head-mountable device in an environment, according to some embodiments of the present disclosure.

As shown in FIG. 8, a head-mountable device 100 can include one or more cameras 130 that each capture a first (e.g., frontal) view of a first object 20 on a front side of the head-mountable device 100, one of the cameras 132 can capture a second (e.g., lateral) view of a second object 30 on a lateral side of the head-mountable device 100, and the camera 134 can capture a third (e.g., rearward) view of an object 40 on a rear side of the head-mountable device 100. It will be understood that not all detections and views need be captured at all times or at the same time. The head-mountable device 100 can operate one or more cameras at any given time to capture views as appropriate for the operations of the head-mountable device 100, such as detection, recording, transmission, and/or output to a user (e.g., with a display).

Figure 9:
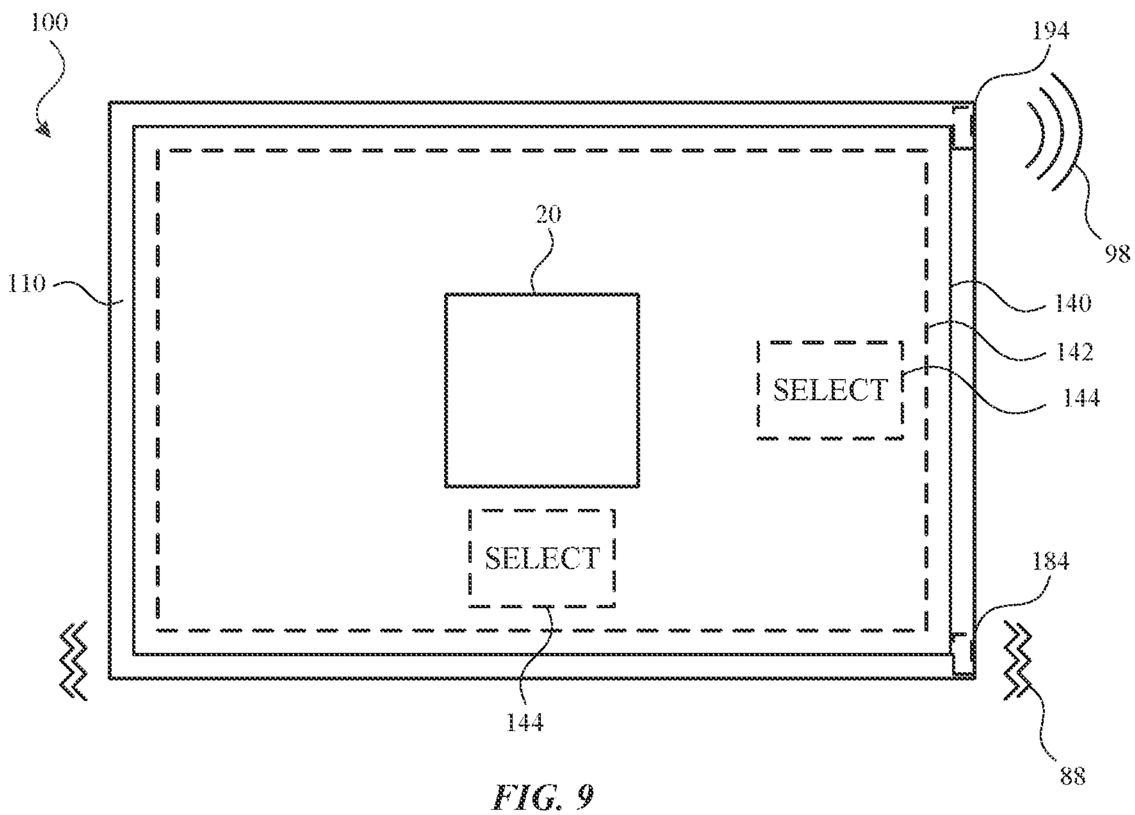
FIG. 9 illustrates a view of a head-mountable device providing a user interface, according to some embodiments of the present disclosure.
Figure 10:
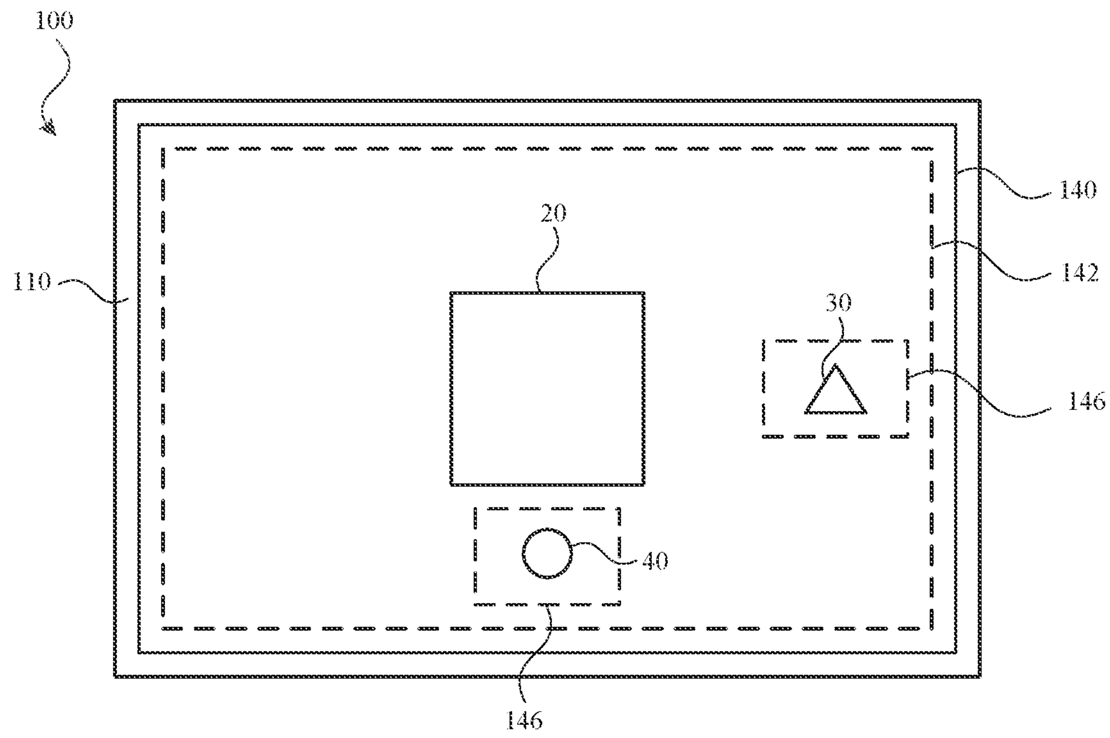
FIG. 10 illustrates another view of the head-mountable device of FIG. 9 providing a user interface with a modified output, according to some embodiments of the present disclosure.
Figure 11:
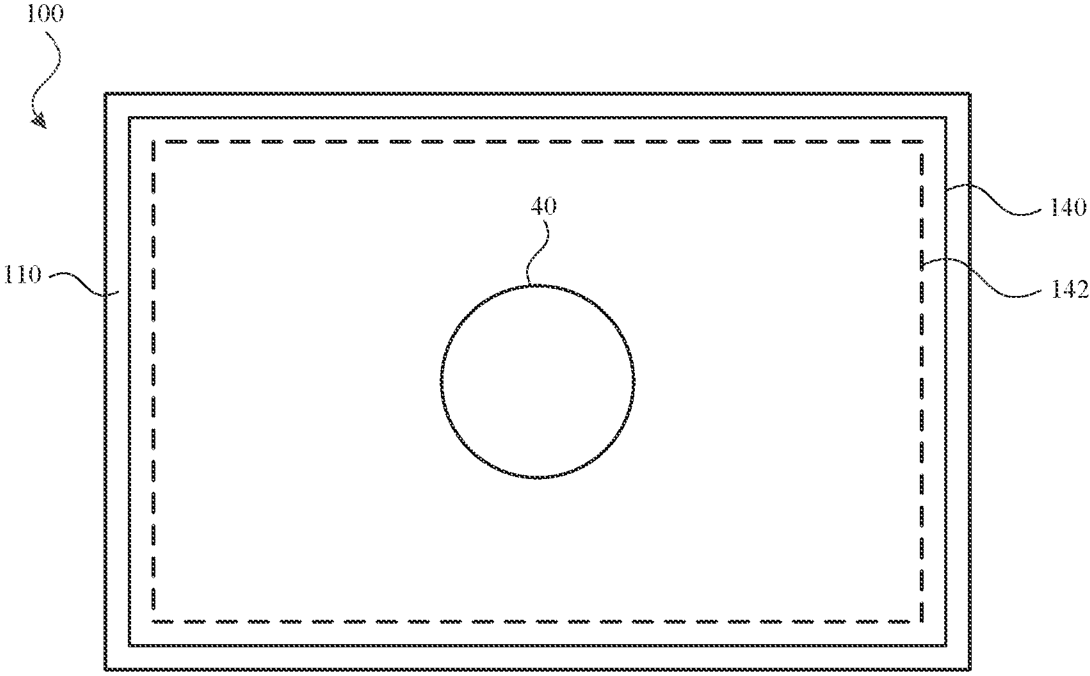
FIG. 11 illustrates another view of the head-mountable device of FIGS. 9 and 10 providing the user interface with a modified output, according to some embodiments of the present disclosure.

Each of FIGS. 9-11 illustrates a view of a head-mountable device providing a user interface, according to some embodiments of the present disclosure. For these or any user interface depicted or described herein, not all of the depicted graphical elements may be used in all implementations, however, and one or more implementations may include additional or different graphical elements than those shown in the figure. Variations in the arrangement and type of the graphical elements may be made without departing from the spirit or scope of the claims as set forth herein. Additional components, different components, or fewer components may be provided.

Referring to FIG. 9, the head-mountable device 100 can include one or more output devices, such as a display 140, for outputting information to the user. Such outputs can be based on the detections of the sensors (e.g., cameras) and/or other content generated by the head-mountable device 100. For example, the output of the display 140 can provide a user interface 142 that outputs one or more elements of a computer-generated reality, for example including a view of an object 20 captured by the front camera. Such visual features can include the view of the physical environment, for example within a field of view of the camera. The user interface 142 can further include any other content generated by the head-mountable device 100 as output, such as notifications, messages, text, images, display features, websites, app features, and the like. It will be understood that such content can be displayed visually and/or otherwise output as sound, and the like.

In some embodiments, the head-mountable device 100 can detect objects and/or events that are outside the field of view of the presently selected camera (e.g., front camera as shown in FIG. 9). In response to such detections, one or more visual features and/or other outputs can be provided by the head-mountable device 100. For example, the user interface 142 can provide a first view of the external environment as well as a selectable feature 144 on the user interface 142 that corresponds to the detection, such as an object, motion, or other event (e.g., sound). One or more of the displayed items in the user interface 142 (e.g., the selectable feature 144) can correspond to physical objects in an environment. The visual feature can include a notification, text, symbol, or depiction of recognized objects that can be rendered as virtual objects having features (e.g., position, orientation, color, size, etc.) that are based on detections of the physical objects in the external environment (e.g., that are outside the presently displayed view). Additionally or alternatively, the user interface 142 can provide a display of virtual objects that do not correspond to physical objects in the external environment (e.g., that are outside the presently displayed view). For example, other objects can be rendered as virtual objects even when no corresponding physical objects are present. Accordingly, it will be recognized that the view can include a view of physical objects and virtual objects.

As shown in FIG. 9, the head-mountable device 100 can identify a source of a detection (e.g., object, motion, event, sound, etc.) as having a particular location (e.g., direction of origin) with respect to the head-mountable device 100. Such determinations can be performed by an array of cameras, microphones, and/or other sensors, as described herein. Upon determination of the location of the source, the corresponding location on the user interface 142 can also be determined based on a known spatial relationship between the sensors and the display 140 of the head-mountable device 100. As further shown in FIG. 9, a selectable feature 144 can be visually output on the user interface 142 to indicate the location of the source. Such an output can help the user visually identify the location of the source even when the user is unable to directly identify the location-based on the user's own detection of the detection (e.g., object, motion, event, sound, etc.).

The visual feature (e.g., selectable feature 144) can include an icon, symbol, graphic, text, word, number, character, picture, or other visible feature that can be displayed at, on, and/or near the source as displayed on the user interface 142. For example, the selectable feature 144 can correspond to a known characteristic (e.g., identity, name, color, etc.) of the source of the detection (e.g., object, motion, event, sound, etc.). Additionally or alternatively, the selectable feature 144 can include color, highlighting, glowing, outlines, shadows, or other contrasting features that allow portions thereof to be more distinctly visible when displayed along with the view to the external environment and/or objects therein. The selectable feature 144 can have a position and/or orientation on the user interface 142 that corresponds to the direction of a camera that captures a corresponding view. For example, the selectable feature 144 can move across the user interface 142 as the user moves the head-mountable device 100 to change the field-of-view being captured and/or displayed. By further example, the selectable feature 144 can maintain its position with respect to the source as the source moves within the user interface 142 and/or the display 140 due to the user's movement.

Additionally or alternatively, the head-mountable device 100 can provide other types of output, including audio (e.g., sound) and/or haptic feedback. For example, the head-mountable device 100 can include a speaker 194 for providing audio output 98 (e.g., sound) to a user. For example, the head-mountable device 100 can include one or more speakers. Where multiple speakers are provided, the speakers can be directed to each of a user's ears to provide stereo sound. Other speaker arrangements are contemplated, including surround sound. Additionally or alternatively, the head-mountable device 100 can be operably connected to speakers that are directed to, near, or in a user's ears. The sound can be generated to corresponding to the direction of the detected object, motion, event, sound, etc. By further example, the head-mountable device 100 can include a haptic feedback device 184 for providing haptic feedback 88 to a user. The haptic feedback 88 can cause the user to become aware of a detected activity.

The selectable features 144 can be selected by a user input, such as gestures, operation of an input/output component of the head-mountable device 100, voice command, and the like. Where a user input selection is detected, corresponding action can be taken with respect to the corresponding view, as described further herein.

Referring now to FIG. 10, an output of a user interface can change in response to detections performed by the head-mountable device and/or inputs provided by a user. For example, as shown in FIG. 10, the output on the user interface 142 of the display 140 can include a main view of one or more objects, such as object 20 captured by forward-facing cameras, as well as additional views 146 that include views from other cameras facing in other directs. For example, the visual features can include a view of an object 30 within a view captured by a lateral camera and/or an object 40 within a view captured by a rear camera. The additional view 146 can have a position and/or orientation on the user interface 142 that corresponds to the direction of a camera that captures a corresponding view. For example, the additional view 146 can move across the user interface 142 as the user moves the head-mountable device 100 to change the field-of-view being captured and/or displayed. By further example, the additional view 146 can maintain its position with respect to the source as the source moves within the user interface 142 and/or the display 140 due to the user's movement. The additional view(s) 146 can include or be accompanied by selectable features, such as those illustrated in FIG. 9, for further modifying the user interface based on detected user inputs.

Referring now to FIG. 11, a head-mountable device can be operated to provide another type of visual output. As shown in FIG. 11, the main view provided on the user interface 142 can change to a different view captured by a different camera than those of other outputs. For example, in response to a detection and/or a user input, the view can change from the forward-facing camera(s) to a view captured by a lateral side camera, a rear camera, and/or another camera. While a view of an object 40 captured by a rear camera is illustrated in FIG. 11, it will by understood that any view captured by any camera can be output in response to one or more detections and/or user inputs. Such a change can remain until additional detections, additional user inputs, and/or other conditions.

As shown in FIG. 11, the additional view can be provided to the exclusion of other views for at least a duration of time. It will be understood that any given output of the user interface 142 provided by the display 140 can omit, exclude, or be provided without any given visual features described herein, such as selectable features 144 and/or additional views 146. For example, such visual features can be removed by the user with a user input and/or based on other criteria, despite other detections and/or inputs. Additionally or alternatively, the user interface 142 can further include any content generated by the head-mountable device 100 as output, such as notifications, messages, text, images, display features, websites, app features, and the like.

Figure 12:
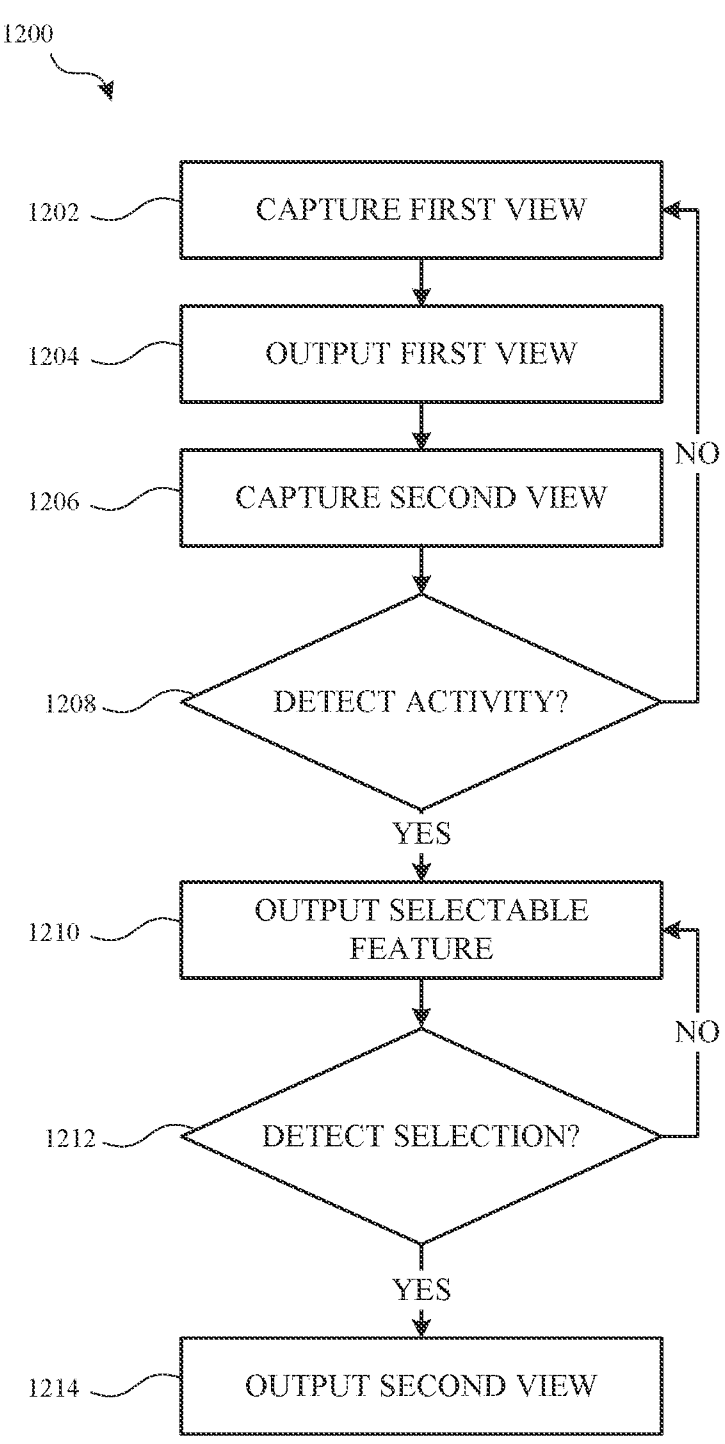
FIG. 12 illustrates a flow diagram of an example process for operating a head-mountable device based on views captured by cameras thereof, according to some embodiments of the present disclosure.

FIG. 12 illustrates a flow diagram of an example process for operating a head-mountable device to detect and respond to features of the environment and/or movement of the user, according to some embodiments of the present disclosure. For explanatory purposes, the process 1200 is primarily described herein with reference to the head-mountable device(s) 100 of any one or more of FIGS. 1-3 and/or 6-11. However, the process 1200 is not limited to the head-mountable device(s) 100 of any one or more of FIGS. 1-3 and/or 6-11, and one or more blocks (or operations) of the process 1200 may be performed by one or more other components or chips of a head-mountable device 100 and/or another device (e.g., an external device). The head-mountable device 100 also is presented as an exemplary device and the operations described herein may be performed by any suitable device. Further for explanatory purposes, the blocks of the process 1200 are described herein as occurring in serial, or linearly. However, multiple blocks of the process 1200 may occur in parallel. In addition, the blocks of the process 1200 need not be performed in the order shown and/or one or more blocks of the process 1200 need not be performed and/or can be replaced by other operations.

In operation 1202, the head-mountable device can capture a first view, such as a view from a front facing camera of the head-mountable device. In operation 1204, the head-mountable device can output the first view, for example on a user interface of the display that is within an optical path of a user wearing the head-mountable device. In such a mode (e.g., first mode) of the head-mountable device, the user can be provided with a view that represents or is based on a view that the user would have if the user were not wearing the head-mountable device. For example, the output of the user interface can show or be based on the physical environment in front of the user.

In operation 1206, the head-mountable device can capture a second view, such as a view from a different camera, such as a lateral camera and/or a rear camera. In operation 1208, the head-mountable device can operate the cameras and/or one or more sensors to detect an activity, such as an object, motion, sound, and/or event in the physical environment. Such a detection can be performed with respect to a region of the physical environment that is other than a region that is within the first view. For example, the activity can be detected on a lateral side and/or rear side of the head-mountable device and/or the user. In some embodiments to perform the detection, the head-mountable device may process a captured image based on one or more of hue space, brightness, color space, luminosity, and the like. The head-mountable device may perform edge detection on the captured image to detect the edges of the individual objects for identification and/or tracking thereof. The head-mountable device may identify the individual objects based at least in part on the determined shapes, the colors of the objects and/or location of colors on the objects, and/or generally any other visible or detectable features of the objects. In some embodiments, the head-mountable device may use one or more image sensors and/or depth sensors to generate a depth map for the captured image to reconcile the individual objects, such as based on the directions in which the individual connectable components are extended. In some embodiments, the head-mountable device may use a thermal (e.g., infrared) sensor to identify and/or track objects. In some embodiments, the head-mountable device may use one or more directional microphones and/or an array of microphones to detect a source of sound in an physical environment.

If an activity is detected, further operations can be performed, such as those in operation 1210. If no activity is detected, the head-mountable device can resume operations at a prior step, such as operation 1202.

In operation 1210, the head-mountable device can output a visual feature. In some embodiments, the visual feature can include a selectable feature, such as the selectable features of FIG. 9. It will be understood that, based on a detected activity, the visual feature can include other visual features, such as a view of an object such as those shown in FIGS. 10 and/or 11. Additionally or alternatively, other outputs can be provided by the head mountable device, such as sound, haptic feedback, and the like. Such outputs can provide additional or alternative indications to the user regarding a detected activity and/or the availability to switch to a different view.

Other components of the head-mountable device 100 can provide one or more other output(s). For example, the head-mountable device 100 can include a speaker for providing audio output (e.g., sound) to a user. By further example, the head-mountable device can include a haptic feedback device for providing haptic feedback to a user.

In operation 1212, where a selectable feature is output on a user interface, the head-mountable device can detect whether a user input indicating a selection is provided by a user. Such detections can include operation of an input detector of the head-mountable device. Such input detectors can include a button, key, crown, keyboards, mouse, and/or another input detector of the head-mountable device. Additionally or alternatively, a user input can be detected by a camera and/or depth sensor of the head-mountable device to detect a gestures, which can be interpreted as user inputs. For example, a portion of the user, such as hands and/or fingers, can be moved by the user with a depiction thereof shown within the user interface with respect to selectable features therein.

If a section is detected, further operations can be performed, such as those in operation 1214. If no section is detected, the head-mountable device can resume operations at a prior step, such as operation 1210.

In operation 1214, the head-mountable device can output an additional (e.g., second) view captured by a different camera of the head-mountable device. For example, such a view can be within a visual feature such as an additional view 146 of FIG. 10. By further example, such a view can be a main view output by the user interface, such as that shown in FIG. 11.

In some embodiments, the view can change yet again based on additional detected activities and or additional user inputs. As such, the head-mountable device can continue operations and allow the user to based on detected activities.

In some embodiments, the multiple views captured by different cameras can be displayed and/or recorded simultaneously. In some embodiments, one or more views can be transmitted to another device for recording and/or viewing thereon. Where multiple cameras have overlapping fields of view, the views can be combined to provide a continuous view within which a user can observe a part thereof. For example, the cameras can capture a combination of views that is entirely continuous about a 360 degree range around the head-mountable device. Such a view can be viewed, transmitted, and/or recorded, with all or some of the continuous view being observable by a user. Where continuous views are provided, the user can select the view by panning within the combined view, such as with a user input. It will be understood that such changes in the combined view are not limited to alternating between discrete views of only individual cameras, but can include selecting views between (e.g., in the overlapping range) of adjacent cameras.

In some embodiments, the camera can be moved to be directed to a source of an activity, event, object, sound, or the like. For example, a camera can move and/or rotate relative to a support structure of the head-mountable device to direct its field of view to a region of interest. The output view on a display can be updated accordingly.

In some embodiments, an output can be omitted based on settings of the head-mountable device. For example, the head-mountable device can be placed in a "do not disturb" mode in which notifications, visual features, and/or other outputs are omitted. Optionally, an indicator to others can be provided by the head-mountable device when such a mode is activated. Such modes can be activated manually or automatically (e.g., based on detected conditions, time, etc.).

Figure 13:
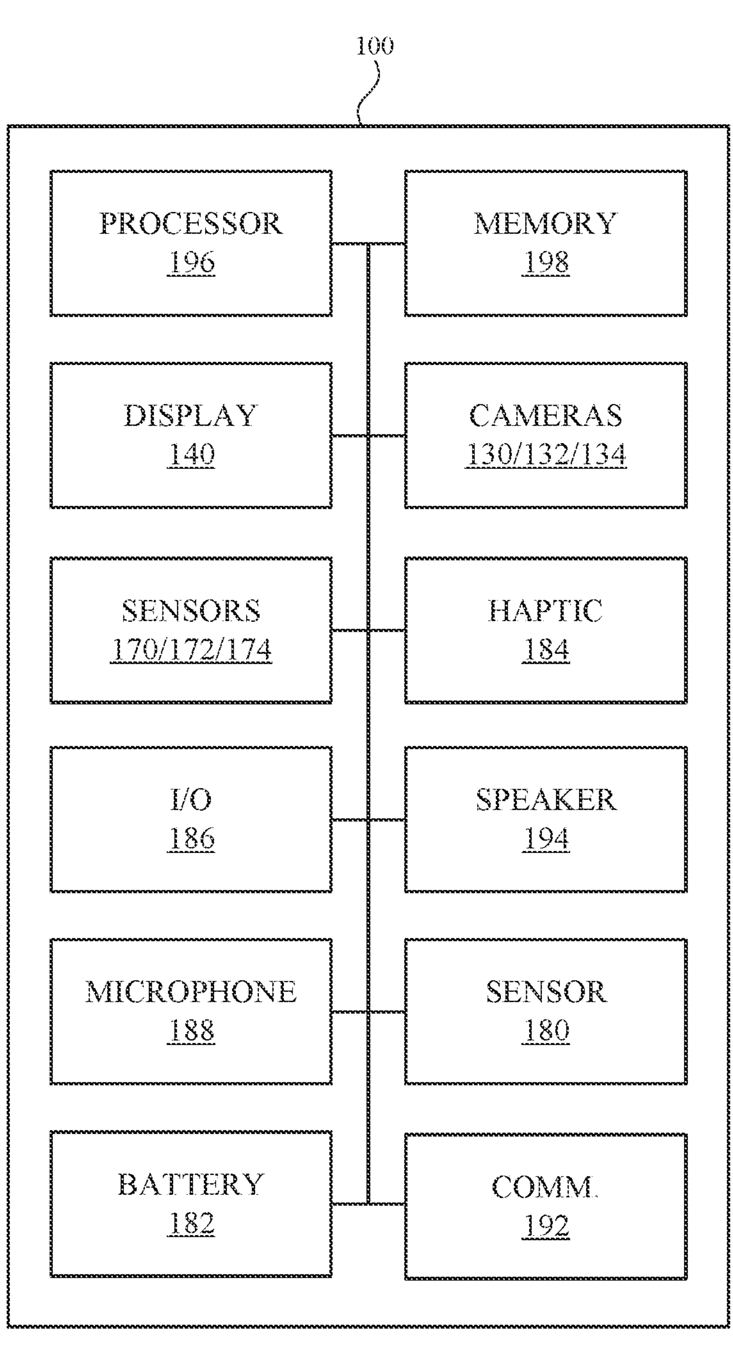
FIG. 13 illustrates a block diagram of a head-mountable device, in accordance with some embodiments of the present disclosure.

Referring now to FIG. 13, components of the head-mountable device can be operably connected to provide the performance described herein. FIG. 13 shows a simplified block diagram of an illustrative head-mountable device 100 in accordance with one embodiment of the invention. It will be appreciated that components described herein can be provided on one, some, or all of a frame, an arm, and/or a band portion. It will be understood that additional components, different components, or fewer components than those illustrated may be utilized within the scope of the subject disclosure.

As shown in FIG. 13, the head-mountable device 100 can include a processor 196 (e.g., control circuitry) with one or more processing units that include or are configured to access a memory 198 having instructions stored thereon. The instructions or computer programs may be configured to perform one or more of the operations or functions described with respect to the head-mountable device 100. The processor 196 can be implemented as any electronic device capable of processing, receiving, or transmitting data or instructions. For example, the processor 196 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 198 can store electronic data that can be used by the head-mountable device 100. For example, the memory 198 can store electrical data or content such as, for example, audio and video files, documents and applications, device settings and user preferences, timing and control signals or data for the various modules, data structures or databases, and so on. The memory 198 can be configured as any type of memory. By way of example only, the memory 198 can be implemented as random access memory, read-only memory, Flash memory, removable memory, or other types of storage elements, or combinations of such devices.

The head-mountable device 100 can further include a display 140 for displaying visual information for a user. The display 140 can provide visual (e.g., image or video) output. The display 140 can be or include an opaque, transparent, and/or translucent display. The display 140 may have a transparent or translucent medium through which light representative of images is directed to a user's eyes. The display 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display 140 for close up viewing. The optical subassembly can include one or more lenses, mirrors, or other optical devices.

The head-mountable device 100 can include one or more sensors 170, 172, and/or 174, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image-based content of the outside world.

The head-mountable device 100 can include an input detector 186 and/or output interface. The input detector 186 can include a button, key, crown, keyboards, mouse, and/or another input detector of the head-mountable device. It will by understood that cameras and/or sensors can be operated as input detectors. The output interface can include any suitable component for connecting head-mountable device 100 to other devices. Suitable components can include, for example, audio/video jacks, data connectors, or any additional or alternative input/output components.

The head-mountable device 100 can include the microphone 188 as described herein. The microphone 188 can be operably connected to the processor 196 for detection of sound levels and communication of detections for further processing, as described further herein.

The head-mountable device 100 can include the speakers 194 as described herein. The speakers 194 can be operably connected to the processor 196 for control of speaker output, including sound levels, as described further herein.

The head-mountable device 100 can include a battery 182 or other power source, which can charge and/or power components of the head-mountable device 100. The battery 182 can also charge and/or power components connected to the head-mountable device 100.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

Accordingly, embodiments of the present disclosure provide a head-mountable device with multiple cameras, which may be used to generate graphical content, provide a video passthrough of the environment, and/or sense objects, people, or events in the environment. The cameras of the head-mountable device can capture views that are output to a display. Other sensors and/or detectors can detect the presence or motion of objects and/or events in an environment of the user and provide outputs that call the user's attention to such objects and/or events. The outputs can include notifications, selectable features of a visual display output, and/or a view that includes the objects and/or events. The cameras can be integrated in a way that provides a low profile, such as by incorporation with other features of the head-mountable device.

Various examples of aspects of the disclosure are described below as clauses for convenience. These are provided as examples, and do not limit the subject technology.

Clause A: a head-mountable device comprising: a first camera positioned to capture a first view on a first side of the head-mountable device; a second camera positioned to capture a second view on a second side of the head-mountable device, opposite the first side; a display operable to output the first view while providing a selectable feature; and an input detector operable to detect an input corresponding to a selection of the selectable feature, wherein, in response to a detection that the selectable feature is selected, the display is further operable to output the second view.

Clause B: a head-mountable device comprising: a first camera positioned to capture a first view on a first side of the head-mountable device; a second camera positioned to capture a second view on a second side of the head-mountable device, opposite the first side; a sensor operable to detect an object on the second side of the head-mountable device; and a display operable: in a first mode, to output the first view, and in a second mode and in response to a detection of the object on the second side, to output a visual feature based on the second view.

Clause C: a head-mountable device comprising: a frame supporting a first camera positioned to capture a first view on a first side of the head-mountable device; and a head engager comprising an adjuster configured to adjust a tightness of the head engager, the adjuster supporting a second camera positioned to capture a second view on a second side of the head-mountable device, opposite the first side.

One or more of the above clauses can include one or more of the features described below. It is noted that any of the following clauses may be combined in any combination with each other, and placed into a respective independent clause, e.g., clause A, B, or C.

Clause 1: the input detector comprises an additional camera positioned to detect motion of hands.

Clause 2: the input detector comprises a speaker configured to detect speech.

Clause 3: a third camera positioned to capture a third view on a third side of the head-mountable device, the third side connecting the first side to the second side; and a fourth camera positioned to capture a fourth view on a fourth side of the head-mountable device, opposite the third side.

Clause 4: a frame supporting the first camera and the display; and a head engager extending from opposing sides of the frame and configured to secure the frame to a head, the head engager supporting the second camera.

Clause 5: a frame supporting the first camera and the display; a first arm extending from a first end of the frame and supporting the second camera at an end of the first arm that is opposite the frame; and a second arm extending from a second end of the frame and supporting a third camera at an end of the second arm that is opposite the frame, the third camera being positioned to capture a third view on the second side of the head-mountable device.

Clause 6: the sensor comprises an array of directional microphones configured to determine a direction of a source of sound.

Clause 7: the sensor is a depth sensor.

Clause 8: the visual feature comprises the second view output with the first view on the display.

Clause 9: the visual feature comprises the second view output without the first view on the display.

Clause 10: the visual feature comprises a selectable feature, the head-mountable device further comprising an input detector operable to detect an input corresponding to a selection of the selectable feature, wherein, in response to a detection that the selectable feature is selected, the display is further operable to output the second view.

Clause 11: the adjuster is rotatable to adjust the tightness of the head engager.

Clause 12: the head engager comprises: a first arm extending from a first end of the frame; a first band portion extending from the first arm; a second arm extending from a second end of the frame; and a second band portion extending from the second arm and adjustably coupled to the first band portion by the adjuster.

Clause 13: the head engager further comprises: a first connector coupling the first band portion to the first arm; and a second connector coupling the second band portion to the second arm.

Clause 14: a third camera positioned on the first connector to capture a third view on a third side of the head-mountable device, the third side connecting the first side to the second side; and a fourth camera positioned on the second connector to capture a fourth view on a fourth side of the head-mountable device, opposite the third side.

As described above, one aspect of the present technology may include the gathering and use of data. The present disclosure contemplates that in some instances, this gathered data may include personal information or other data that uniquely identifies or can be used to locate or contact a specific person. The present disclosure contemplates that the entities responsible for the collection, disclosure, analysis, storage, transfer, or other use of such personal information or other data will comply with well-established privacy policies and/or privacy practices. The present disclosure also contemplates embodiments in which users can selectively block the use of or access to personal information or other data (e.g., managed to minimize risks of unintentional or unauthorized access or use).

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:

a first camera positioned to capture a first view on a first side of the head-mountable device;

a second camera positioned to capture a second view on a second side of the head-mountable device, opposite the first side;

a display operable to output the first view while providing a selectable feature corresponding to the second view and forgo output of the second view while outputting the selectable feature; and an input detector operable to detect an input corresponding to a selection of the selectable feature, wherein, in response to a detection that the selectable feature is selected, the display is further operable to output the first view and the second view.

2. The head-mountable device of claim 1, wherein the input detector comprises a speaker configured to detect speech.

3. The head-mountable device of claim 1, further comprising:

a third camera positioned to capture a third view on a third side of the head-mountable device, the third side connecting the first side to the second side; and a fourth camera positioned to capture a fourth view on a fourth side of the head-mountable device, opposite the third side.

4. The head-mountable device of claim 1, further comprising:

a frame supporting the first camera and the display; and a head engager extending from opposing sides of the frame and configured to secure the frame to a head, the head engager supporting the second camera.

5. The head-mountable device of claim 1, further comprising:

a frame supporting the first camera and the display;

a first arm extending from a first end of the frame and supporting the second camera at an end of the first arm that is opposite the frame; and a second arm extending from a second end of the frame and supporting a third camera at an end of the second arm that is opposite the frame, the third camera being positioned to capture a third view on the second side of the head-mountable device.

6. A head-mountable device comprising:

a first camera positioned to capture a first view on a first side of the head-mountable device;

a second camera positioned to capture a second view on a second side of the head-mountable device, opposite the first side;

a sensor operable to detect an object on the second side of the head-mountable device; and a display operable:

in a first mode, to output the first view while forgoing output of the second view, and in a second mode and in response to a detection of the object on the second side, to output a visual feature corresponding to the second view.

7. The head-mountable device of claim 6, wherein the sensor comprises an array of directional microphones configured to determine a direction of a source of sound.

8. The head-mountable device of claim 6, wherein the sensor is a depth sensor.

9. The head-mountable device of claim 6, wherein, in the second mode and in response to the detection of the object on the second side, the display is further operable to output the first view while outputting the visual feature.

10. The head-mountable device of claim 6, wherein the visual feature comprises a selectable feature, the head-mountable device further comprising an input detector operable to detect an input corresponding to a selection of the selectable feature, wherein, in response to the detection that the selectable feature is selected, the display is further operable to output the second view.

11. The head-mountable device of claim 6, further comprising:

a third camera positioned to capture a third view on a third side of the head-mountable device, the third side connecting the first side to the second side; and a fourth camera positioned to capture a fourth view on a fourth side of the head-mountable device, opposite the third side.

12. The head-mountable device of claim 6, further comprising:

a frame supporting the first camera and the display; and a head engager extending from opposing sides of the frame and configured to secure the frame to a head, the head engager supporting the second camera.

13. The head-mountable device of claim 6, further comprising:

a frame supporting the first camera and the display;

a first arm extending from a first end of the frame and supporting the second camera at an end of the first arm that is opposite the frame; and a second arm extending from a second end of the frame and supporting a third camera at an end of the second arm that is opposite the frame, the third camera being positioned to capture a third view on the second side of the head-mountable device.

* * * * *